US010475099B1

(12) United States Patent
Nomula et al.

(10) Patent No.: US 10,475,099 B1
(45) Date of Patent: Nov. 12, 2019

(54) DISPLAYING RELEVANT CONTENT

(71) Applicant: A9.com, Inc., Palo Alto, CA (US)

(72) Inventors: Jagadeshwar Reddy Nomula, Fremont, CA (US); Erick Cantu-Paz, San Jose, CA (US); David Mark Ciemiewicz, Mountain View, CA (US); Francois Huet, Palo Alto, CA (US); Priyank Singh, San Francisco, CA (US)

(73) Assignee: A9.COM, INC., Palo Alto, CA (US)

( * ) Notice: Subject to any disclaimer, the term of this patent is extended or adjusted under 35 U.S.C. 154(b) by 961 days.

(21) Appl. No.: 14/864,324

(22) Filed: Sep. 24, 2015

(51) Int. Cl.
*G06Q 30/06* (2012.01)
*G06T 19/20* (2011.01)
*G06F 16/951* (2019.01)

(52) U.S. Cl.
CPC ....... *G06Q 30/0625* (2013.01); *G06F 16/951* (2019.01); *G06Q 30/0643* (2013.01); *G06T 19/20* (2013.01)

(58) Field of Classification Search
CPC .................................................. G06Q 30/0625
USPC ....................................................... 705/26.62
See application file for complete search history.

(56) References Cited

U.S. PATENT DOCUMENTS

| | | | | |
|---|---|---|---|---|
| 6,032,129 A * | 2/2000 | Greef | ..................... | G06Q 30/06 705/26.43 |
| 7,483,844 B2 * | 1/2009 | Takakura | .......... | G06F 17/30522 705/26.41 |
| 2001/0032140 A1 * | 10/2001 | Hoffman | ................ | G06Q 30/02 705/26.43 |
| 2003/0065524 A1 * | 4/2003 | Giacchetti | ............ | A45D 44/005 700/49 |
| 2005/0091118 A1 * | 4/2005 | Fano | .................... | G06F 17/3087 705/26.43 |
| 2005/0261980 A1 * | 11/2005 | Hadi | ...................... | G06Q 30/06 705/26.43 |
| 2005/0267778 A1 * | 12/2005 | Kazman | ................. | G06Q 10/00 705/26.1 |
| 2006/0218046 A1 * | 9/2006 | Carfi | ..................... | G06Q 30/02 705/26.43 |
| 2006/0277117 A1 * | 12/2006 | Lewis | .................... | G06Q 20/12 705/26.2 |
| 2007/0088617 A1 * | 4/2007 | Yang | ..................... | G06Q 30/02 705/26.43 |

(Continued)

*Primary Examiner* — Alexis M Casey
(74) *Attorney, Agent, or Firm* — Hogan Lovells US LLP

(57) ABSTRACT

Various approaches provide for determining the selection and/or ranking of items to display based at least in part upon the probabilities of a user being interested in those items. The probabilities can be based on profile information of a user. The profile information can include a three-dimensional virtual model of the user. When a search for content is received, the information for the three-dimensional virtual model can be used to determine a set of items. For each item, a matching score quantifying a visual appreciation can be determined based on how well an item virtually "fits" the three-dimensional virtual model. Based on the matching score, the selection and/or ranking of items to display can be determined. In some situations, the items can be shown to appear to be worn by the three-dimensional virtual model. The user can purchase items, cause item information to be presented to other users or sent to other devices, and/or perform other such actions.

17 Claims, 9 Drawing Sheets

(56) References Cited

U.S. PATENT DOCUMENTS

| | | | |
|---|---|---|---|
| 2008/0097872 A1* | 4/2008 | Peckover | G06Q 30/02 705/26.43 |
| 2008/0281723 A1* | 11/2008 | Todd | G06Q 30/06 705/26.35 |
| 2009/0271294 A1* | 10/2009 | Hadi | G06Q 30/06 705/26.1 |
| 2011/0022965 A1* | 1/2011 | Lawrence | G06F 3/011 715/747 |
| 2011/0106662 A1* | 5/2011 | Stinchcomb | G06Q 30/06 705/26.43 |

* cited by examiner

DISPLAYING RELEVANT CONTENT

BACKGROUND

With the expanding use of computer networks, such as the Internet, an increasing amount of commerce is conducted electronically. Retailers, manufacturers, and others have made virtually every type of product and service available to consumers via computer networks. The advantages of purchasing products and services electronically from retailers are numerous. For example, consumers are presented with a wide selection of products to choose from and have the convenience of shopping for products from anywhere a consumer may have access to a computer network, rather than making a trip to a typical department store.

Typically, online retailers may attempt to organize their websites in a manner that improves customers' experience at the website and makes it simple for customers to find and purchase desired products. For example, the website may provide a search interface that enables a customer to search for a desired product. The search interface may return search results based on relevance of particular products to the customer's search query. However, even with a search interface in place, it can be difficult for customers to find relevant products. For example, unless the user knows an exact brand or style of product that the user wants, the user might have to search through hundreds or thousands of different products using various options to attempt to locate the type of product in which the user is interested. If the user is interested in a product of a specific type, the user might have no option but to sift through these results, potentially only being able to narrow the results by price, ratings, availability, or other such options. This can be time consuming and potentially frustrating for a user, which can result in the user not locating an item of interest and the marketplace not completing a transaction.

BRIEF DESCRIPTION OF THE DRAWINGS

Various embodiments in accordance with the present disclosure will be described with reference to the drawings, in which.

DETAILED DESCRIPTION

Figure 1:
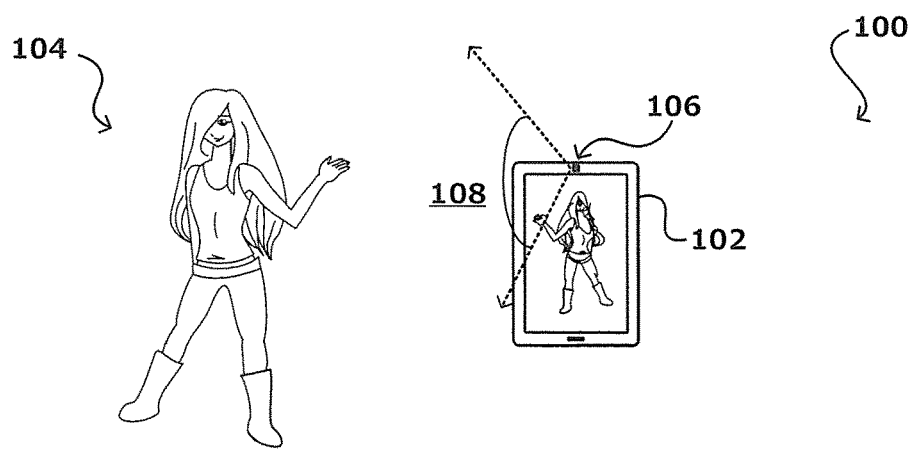
FIG. 1 illustrates an example of a user interacting with a computing device in accordance with at least one embodiment.

Systems and methods in accordance with various embodiments of the present disclosure may overcome one or more of the aforementioned and other deficiencies experienced in conventional approaches to determining content to provide to a user. In particular, various embodiments attempt to determine the selection and/or ranking of content (e.g., products and/or services) to display to a user based at least in part upon the probabilities of the user being interested in that content. The probabilities can be based on profile information of a user. The profile information can include a model (e.g., a three-dimensional virtual model) of the user and other user information that can be used to represent the general size (e.g., body dimensions, height, etc.) of the user as well as other characteristics of the user (e.g., shoe size, complexion, etc.). The profile information can include additional information related to, for example, preferences of the user (e.g., clothing preferences, accessory preferences), as well as other information that may indicate interests of the user as they relate to shopping, traveling, dinning, etc. The additional information can be used as a search refinement parameter, and can further limit the results displayed.

A user can input a query term to search for an item (e.g., products and/or services) provided by an electronic marketplace. Each item can be associated with information. The information might be an image of the item, a description of the item, information that describes a three-dimensional virtual model of a visual representation of the item, etc. When the search is received, the marketplace can obtain the profile information that includes the three-dimensional virtual model of the user and determine a set of items matching the query term. For each item, a matching score quantifying a visual appreciation can be determined based on how well an item virtually "fits" the three-dimensional virtual model of the user. For example, various fitting algorithms or other similarity algorithms such as curve fitting algorithms, polygon fitting algorithms and the like can be used to determine a virtual fit of each item on the three-dimensional virtual model of the user. The algorithms can use the three-dimensional virtual model of the user and model or other similar information associated with each of the items. Based on the matching score, a result set of items can be determined. The result set can include, for example, items having the highest matching score, and these items can be displayed, in an ordered arrangement based on the matching score, with additional information associated with each item. In accordance with various embodiments, it can be desirable to rank items that the user will be more likely to view and/or purchase higher than other items, in order to improve the user experience and help the user more quickly locate items of interest. In various embodiments, the items can be shown to appear to be worn by the virtual representation of the user. Such a process enables a user to select or interact with any appropriate items displayed. In at least some embodiments, selected images or items can be modified and rendered to appear to be displayed on the virtual representation of the user. The user can purchase items, cause item information to be presented to other users or sent to other devices, and/or perform other such actions.

Various other applications, processes, and uses are presented below with respect to the various embodiments.

FIG. 1 illustrates an example situation 100 wherein a user 104 is interacting with a computing device 102. In this example, although a tablet computing device is shown in this example, it should be understood that various other types of electronic device that are capable of determining and processing input can be used in accordance with various embodiments discussed herein. These devices can include, for example, smart phones, e-book readers, desktop computers, notebook computers, personal data assistants, video gaming consoles or controllers, smart televisions, and portable media players, wearable computers (e.g., glasses, watches, etc.) among others. Further, the components illustrated can be part of a single device, while at least some components illustrated and otherwise utilized for such a device can be provided as one or more peripheral devices or accessories within the scope of the various embodiments.

In a conventional system, a user can search for items (goods and/or services) in an electronic item catalog of an electronic marketplace. A catalog of items (including each item's description) may be organized into a "browse tree" structure in order to facilitate searching. A browse tree permits users to "browse" through various items, which are arranged in the form of a hierarchical tree. The browse tree may be displayed via a user interface as a collection of hyperlinks, each hyperlink corresponding to a section of the tree. A user can find an item by navigating through the various nodes of the browse tree.

Additionally, in many situations, the electronic marketplace may provide a search interface that enables a user to search for a desired item. The search interface may return search results based on relevance of particular items to the customer's search query. However, even with a search interface in place, it can be difficult for customers to find relevant items. For example, unless the user knows an exact brand or style of an item that the user wants, the user might have to search through hundreds or thousands of different items using various options to attempt to locate the type of item in which the user is interested. If the user is interested in an item of a specific type, the user might have no option but to sift through these results, potentially only being able to narrow the results by price, ratings, availability, or other such options. For many users, an experience more akin to window shopping might be desirable, where a user can view items that might be of interest to the user, regardless of specific type or category in at least some embodiments, and view or obtain information on anything that catches the user's eye. Further, the user might want to be able to view items that are more likely to be of interest to the user than a category or type of items, where items are typically arranged by price, rating, or other criteria that are not necessarily tied into the particular preferences of the user. Similarly, the ability to display items that the user is likely to view and/or purchase can help the provider of the content, as the profit and/or revenue to the provider will increase if items of greater interest to the user are prioritized in the presentation of content.

Accordingly, in accordance with various embodiments, image and other information can be used to generate a visual presentation of a user, such as a three-dimensional virtual model of the user. The three-dimensional virtual model can be used to refine search results from a search query at, for example, an electronic marketplace for various items. The image information used to generate the three-dimensional virtual model can be obtained from a number of sources, such as camera, a computing device having a camera, user image data provided using a motion, position, and/or gesture recognition system operable to capture image and/or position data of a user, a storage device, etc. In the example of FIG. 1, the image information is being captured by a computing device (or gesture recognition system). In this example, the computing device 102 has one or more imaging elements 106 positioned so as to be able to capture images (or video) of at least a portion of a user positioned in a conventional location with respect to the device. In this example where the computing device has a primary display screen, the imaging elements can be positioned so as to capture images of a user positioned substantially in front of the display screen, where the user would typically be positioned to interact with the device. The imaging elements can include at least one camera or sensor with a lens having an angular field of view 108 such that image information can be captured of a user as long as at least a portion of that user 104 is at least partially within that field of view 108.

Using the image information and other sensor data (e.g., audio data associated with the user, depth data obtained using stereoscopic cameras or distance sensors, or infrared data), software executing on the computing device (or in communication with the device) can attempt to determine a three-dimensional virtual model of the user. Such a determination can be performed using various approaches. In one such approach, two-dimensional image information can be captured to determine certain direction and motion information. Devices can utilize structured lighting with two-dimensional image capture to obtain three-dimensional information by projecting a regular pattern of light (e.g., infrared (IR) light) and analyzing the changes in the reflected pattern due to three dimensional objects. Other approaches such as those used for motion capture use a similar approach by monitoring the change in location of specific features during user movement. In some embodiments, two-dimensional image capture can be enhanced using a distance sensor, range finders, ultrasonic transceiver, or other such device capable of providing distance information. In some embodiments, three-dimensional or stereoscopic image information can be captured to provide three-dimensional point data, or disparity information. Various other approaches can be utilized as well as should be apparent to one of ordinary skill in the art in light of the teachings and suggestions contained herein.

Figure 2A:
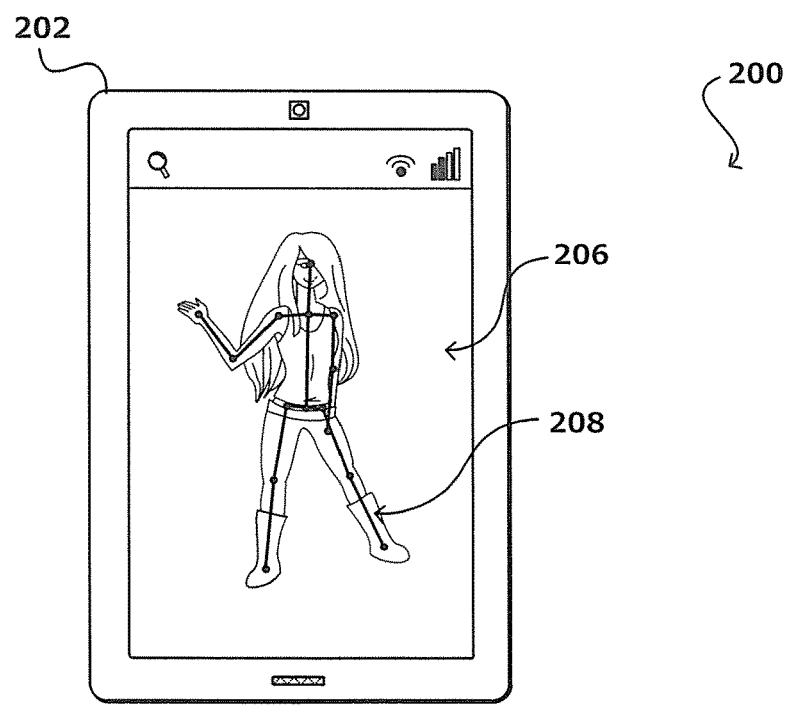
FIGS. 2A and 2B illustrate an example of obtaining user data captured and utilized by a device such as that illustrated in FIG. 1 that can be provided in accordance with various embodiments.

Image information captured by one or more capture elements of a computing device can be used to determine various types of information. In the example state 200 of FIG. 2A, for example, the captured data is analyzed to provide at least two types of information. First, at least one camera is used to capture a view of the user 206 of the device 202. The view of the user can be used for a variety of purposes, such as to perform facial recognition or user identification, as well as to determine the outline of the user's body in its current configuration relative to the computing device. Using the structured lighting reflections or other such information, three-dimensional point data can also be determined and analyzed to generate a three-dimensional virtual model 208 of the body of the user that represents the current orientation of the user in three dimensions. Relying solely on two-dimensional information can make it difficult to determine when one of the user's arms is held towards the front or back of the user, for example. Further, analyzing full resolution image data can be very computationally intensive, which can provide a significant lag in motion detection. By using point data from structured lighting and determining a basic model 208 of the user's body, which can relatively accurately reflect motions of the user, gestures and motions can be determined in near real time that enable a user to provide input to the computing device.

Figure 2B:
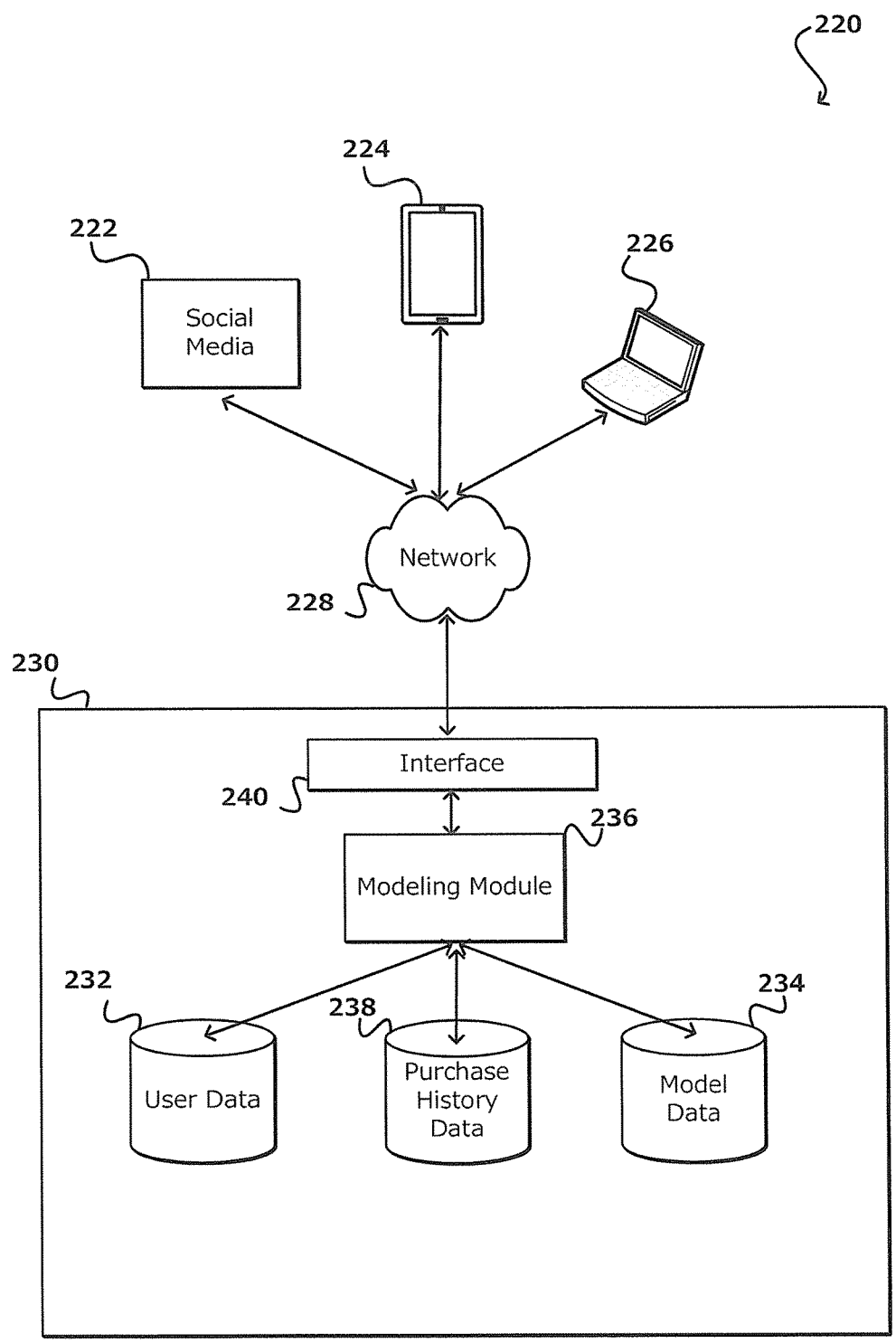

In accordance with various embodiments, as additional information for the user is gathered, from sources such as social media websites, users providing user input, purchase history information of the user from various data stores, the three-dimensional virtual model can be updated accordingly. A fit metric, wearability metric, likeness score or other such metric that estimates the fit of an item (e.g. clothing, jewelry, etc.) as worn on the three-dimensional model can be used to determine the content to present to a user, and the arrangement of that content, which can improve the overall user experience while increasing profit for the provider of that content. Situation 220 of FIG. 2B illustrates client devices 224 and 226 that can provide the additional information. The additional information can be provided across at least one network 228, and can be received by a content provider environment 230 (e.g., an electronic marketplace). In this example, a call received to the resource provider environment 230 can be received by an interface layer 240 of the environment. As known for network environments, the interface layer can include components such as interfaces (e.g., APIs), load balancers, request and/or data routers, and the like. If the request is to provide image and/or other information, such as for the three-dimensional virtual model, information for the request can be directed to modeling module 236, which can store the image and other information in model data store 234 or other such repository. In various embodiments, the modeling module can use other information, such as information from a user data store 232 and a purchase history data store 238 or other such location to, for example, generate the three-dimensional virtual model of the user. As described, the three-dimensional virtual model can be used to retrieve content, such as in response to request for content in an electronic marketplace. The content can include a plurality of images to be displayed as part of a set of search results or set of potential items of interest, although various other types of content and uses for images can be utilized as well within the scope of the various embodiments.

The user data store 232 can include profile information such as the user's height, complexion, hair color, eye color, style preferences, any behavioral or user segments that may describe various attributes of the user including, for example, demographics, gender, age, any web content that is browsed or accessed by the user, advertisements or content in which the user demonstrated interest (e.g., through clicks, conversions, etc.), among other information.

The purchase history data store can include items previously purchased by the user. In some instances the items can be clothing, shoes, or other apparel. The items may be associated with size information, such as the dimensions of the clothing, shoes, and other apparel. The dimensions can be used by the modeling module to update the three-dimensional virtual model of the user. For example, in the situation where a user has purchased a dress, information about the dress can be stored for the user, such as the size and dimensions of the dress. Additional information, such as information specifying how well the dress fit the user can be stored as well. The additional information can be used as a search refinement parameter, and can further limit the results displayed. In various embodiments, a graphical user interface can be provided. The interface can includes a plurality of search preference fields. The fields can be used to modify, filter, or otherwise adjust search results. An input for one of the plurality of search preference fields can be received, and based on the input, the search refinement parameter can be updated. Example inputs can include information relating to, for example, clothing fit preferences, hair color, skin color, clothing material preferences, or other such preferences. For example, in the situation where the user indicates that the dress fit well, the search refinement parameter can be updated and the information can be used by the modeling module to update the three-dimensional virtual model of the user, or at least used to determine related items to present to a user, and the arrangement of those items. In this way, when a user searches for a dress, the content provider environment can use the three-dimensional virtual model to determine a fit metric, wearability metric, likeness score or other such metric that estimates the fit of an item as worn on the three-dimensional model. In accordance with an embodiment, the metric can be further tuned based on the profile data. For example, the profile data can be used to determine certain colors of dresses that may appeal to the user. The profile data may also allow for suggested products to be displayed to the user. For example, the profile data can be used to suggest shoes, hats, jewelry, accessories, and other various other items that may be of interest to the user. Accordingly, in accordance with various embodiments, the metric can be used to identify or obtain content that is responsive to the user's query and, as a result, identify or obtain content that is determined to be most relevant to the user operating the computing device. Accordingly, various embodiments provide a search experience that enables users to quickly scan through content relating to items that are likely to be of interest to the user, which can improve the likelihood of clicks, purchases, and revenue to the provider of that content.

In some cases, a request received to the content provider environment 230 might be from another entity, such as a third party image provider 222. Such providers (e.g., social media websites, electronic image galleries, etc.) may provide images to be used to generate the three-dimensional virtual model of the user). The interface layer can determine the type of request and cause information to be forwarded to the modeling module, or other such element, which in some embodiments can cause the images to be stored to the user data store 232 or other appropriate location. Any information associated with the images, such as a description or identification of one or more features of the user represented in the images, can also be provided and stored in the user data store 232. In at least some embodiments, information about features can be determined through components of the content provider environment, or otherwise determined.

Figure 3A:
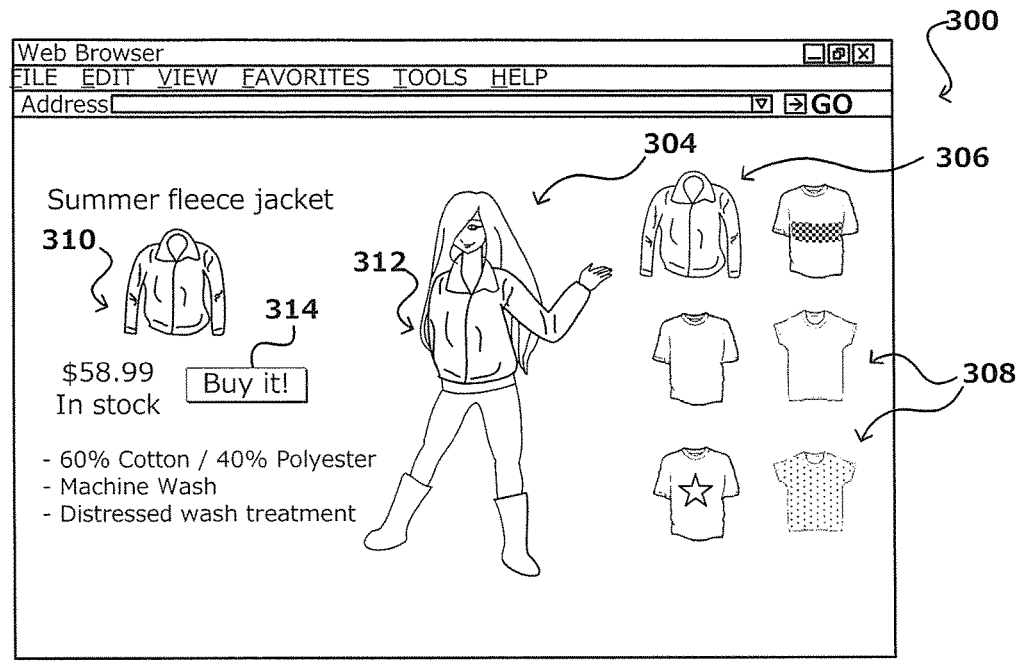
FIGS. 3A and 3B illustrate example interfaces with which a user can interact in accordance with various embodiments.

FIG. 3A illustrates an example 300 of one such interface that can be utilized in accordance with various embodiments. Although a Web page showing content from an electronic marketplace is described for purposes of explanation, it should be understood that any appropriate interface rendering any appropriate type of content can take advantage of embodiments described herein. In this example, a user has performed a search for items (e.g., goods and/or services) in an electronic marketplace. A set of content is determined to be of interest to the user based upon information known or generated about the user and the content. This can include, for example, a likelihood of the user "clicking on" or otherwise selecting content to obtain further information about the item represented in the image. This can also include a likelihood of the user consuming (i.e., purchasing) the item represented in the image.

A fit metric, wearability metric, likeness score or other such metric that estimates the fit of an item (e.g. clothing, jewelry, etc.) as worn on the three-dimensional model can be used to rank or otherwise order the items such that items that are more likely to be purchased, or at least viewed, by the user are presented first, or at the top of the images in the figure, in order to enable the user to more quickly and easily locate content of interest. The metric can be based a three-dimensional virtual model of the user, dimensions of the items to be presented, and other information such as purchase history of the user, user provided input, etc.

When a set of items, or other content, is to be provided to a user, the content server in this example can contact an item ranking component, or other such system or service, in order to determine which items are to be displayed, and in what order. As shown in FIG. 3A, a page of content corresponding to clothing items offered through an electronic marketplace is displayed. The page can be a Web page rendered in HTML or another such markup language, for example, and can include a visual representation of the user. In one example, a Web page displays apparel items 308 that the user can purchase through an electronic marketplace. Although clothing items are shown, it should be understood that various types of item can take advantage of approaches discussed herein, and that various other types of content can be selected or utilized as well in other examples.

As described, the selection of items to be displayed can be determined in accordance with embodiments described herein, as well as performed using any appropriate technique, such as by performing a keyword search, navigating to a particular category of items, accessing user-specific recommendations, and the like. The items 308 in the interface are images of actual products in this example, arranged in an array to the right of the interface, although various other representations and arrangements can be used as well as should be apparent in light of the present disclosure. As described, the items can be arranged based on how well the items may fit the user, where items fitting better allow for a higher likelihood of the user consuming (i.e., purchasing) the item represented in the image.

In FIG. 3A the user has selected a specific item 306. Upon the user selecting that item, information corresponding to that item can be requested, such as by sending a request to a Web server for content corresponding to an item identifier associated with the image of the item that is displayed. In this example, information 310 for the selected item 306 can be displayed on the page to enable the user to obtain additional information about that item. There can be various types of content and information provided, although in the example display the information includes at least one image of the item, pricing and description of the item, and an option to purchase the item.

In accordance with various embodiments, displaying a view 304 of the user in this example, however, enables selected items to be displayed with that view of the user. As described, the view can include a three-dimensional virtual model of the user. In various embodiments, the view can include a live view of the user as represented in image data captured in the field of view of a camera of a computing device, gesture system, or other like device. In yet other embodiments, the view can include a combination of the model and live view of the user. Since the view of the user is displayed on the same page, software executing on the client device and/or a remote server can cause a view 312 of the selected item to be displayed on, over, or with respect to the view 304 of the user. As illustrated, such an approach can enable a user to place one or more clothing items over the view of the user, in order to provide the user with an idea of what the clothing item might look like on the user. The user can combine items to put together looks or outfits, and can see how those items go with the user's skin tone, hair color, and other such information. An interface element 314 may be provided, such as a button which, when activated, purchases the selected item immediately, puts the selected item into a "wish list," or places the selected item into a "shopping cart" for later purchase, etc. Additional actions, commands, and/or interface elements may be provided, for example related to consumption-related actions.

In addition to color information, however, approaches discussed herein can also modify or render image information for various clothing items such that the view of the user can appear to "wear" those items, where the rendering of the items substantially corresponds to the shape of the user as represented in the view 304. For example, the arm of the selected jacket can be rendered to substantially match the position of the user's arm in the view. A main portion of the clothing item image can be stretched, compressed, or otherwise rendered to substantially correspond to the user's torso, in order to provide a view of what the item would actually look like if worn by the user. As discussed herein, the dimensions of the user and dimensions of the clothing can help the user to determine the appropriate size of the item for the user since the item can be rendered with the approximate dimensions so the user can see how that particular size will look on the user (i.e., whether it will be too small, too long, etc.). Further, because the view of the user presented can be modified (e.g., using various control elements not shown) the user can view different poses and perform different actions in the clothing, such as to see how the length of a pair of pants would work with bent knees as opposed to standing upright, how the back would look, etc.

Figure 3B:
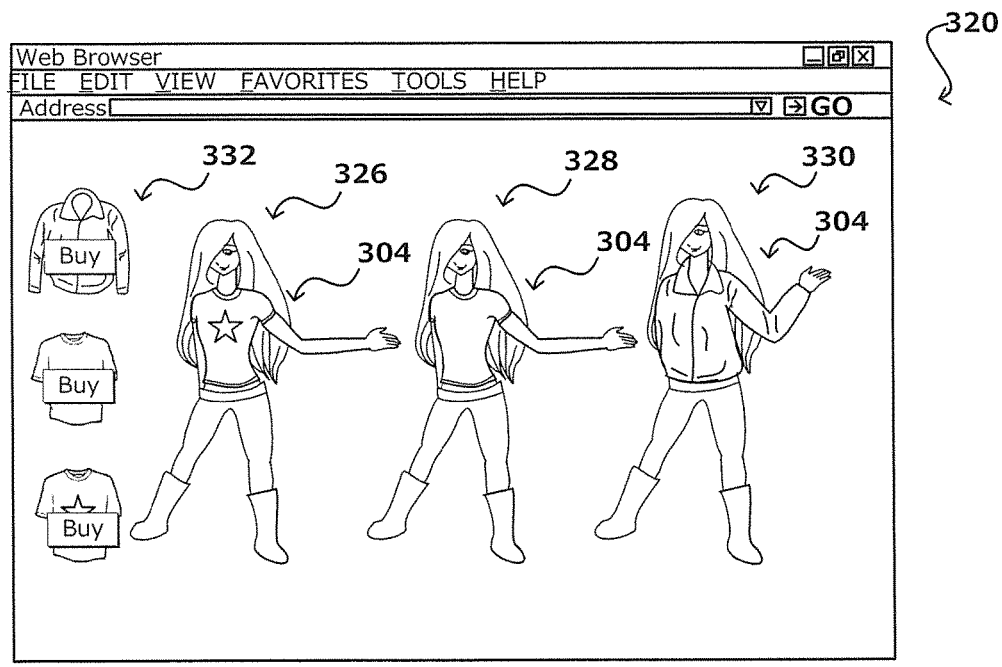

In various embodiments, a user can select an environment and be shown in that environment virtually trying on the clothing and other items. The environments can include different geographic locations, and places, eras, and the like. For example, a user can virtually try on a swim suit and a beach or sport clothing at a running track. The environment and virtual representation of the user can be displayed in a popup window, an overlay, a new window, embedded within the same window, or in any number of different ways. Such an approach can enable a user to virtually try on different clothing items and combinations of clothing items in different environments. For example, in the example state 320 of FIG. 3B the user has selected several different clothing items and has decided to try on those items in a default environment (e.g., the virtual marketplace). In this example, the user has entered into an item comparison mode, wherein for each item selected, a respective item can be displayed over a view of the user. For example, upon selecting the items, a view 326, 328, and 330 of the newly selected items is displayed over view 304 of the user. An item pane 332 can be provided that includes a representation of each of the items the user is "trying on." The item pane can be in displayed in an overlay, a popup, an area of a website or application, or anywhere else as is known in the art.

The user can control the orientation of each of the views (326, 328, and 330), individually or as a group, to see how the items looks from the back, side, top, below, or some other angel of the user. Controlling the orientation can be accomplished in another of ways. In an example, virtual on-screen controls can be provided to control the orientation. In another example, the change in orientation can be controlled based on a change in the orientation of the computing device. In yet another example, live image information of the user can be used to control the orientation of the user. In various embodiments, the user can select different items to change the items displayed over the user. For example, if the user had previously selected the pants or boots that are displayed with the view 328, the user can view different tops with the pants and boots to see which combination she prefers. Further, although only shirts are shown in this example, the user can also select belts, hats, jewelry, watches, purses, tattoo designs, and other such items as well within the scope of the various embodiments.

As described, embodiments provide for determining the selection and/or ranking of items to display to a user based on the probability of the user being interested in those items. One way to measure how interested a user will be in an item is to determine how well the item "fits" the virtual representation of the user. Conventionally, a user would go into a store and try clothing. An associate working at the store, a friend, or other person may help the user identify clothing having a particular fit, or items of clothing having a particular fit to other items of clothing. In accordance with various embodiments, approaches enable the user to virtually try on clothes to find clothing having the right fit. In order to provide the selection and rendering capability to try on the items, a script or application rendering the Web content (or other appropriate content) in at least some embodiments needs to be able to access and analyze the profile data associated with the user. The profile, image data from a camera, and/or gesture system can be analyzed to determine relative positions of the wrist and elbow points, for example, which can be considered skeleton data. In the example skeleton data 400 illustrated in FIG. 4A, the script might determine the relative positions of a shoulder point 406, elbow point 410, and hand point 408 to determine a relative direction in which the user is pointing. In some embodiments the forearm direction as defined by the elbow and hand points can be used to determine the direction, while more complex systems might attempt to use the shoulder point as well as a head point or other such information to attempt to determine where the user is actually intending to point (as the elbow point will generally not correspond to the point of view of the user). The script also can use information such as the angle of the user's upper arm, as defined by the shoulder and elbow points, to determine the amount of extension of the user's arm, although distance of the hand from the torso or other such information can be used as well. Such information can be used to determine how far out the user is attempting to select, such as where the items are arranged in columns and the user uses extension to designate the column from which to select. In at least some embodiments the arms can behave like laser pointers that create beams that point to certain locations (but may or may not actually be shown on the display). When one of those beams intersects an item or element on the page, an appropriate action can be taken. In some embodiments, a virtual ray tracing is performed using the user's forearm, and the intersection of a ray with an item can be determined using various approaches that can be similar in at least some aspects to touch input, cursor input, and the like.

The profile data also can be used to determine how to render one or more image items with respect to a view of the user. As discussed, two-dimensional image data can be computationally expensive to analyze, particularly to determine three-dimensional information. In order to determine the relative positions of a user's appendages for purposes of rendering clothing or other items thereon, the skeleton data can provide a faster and potentially more accurate description of those relative positions. For example, the legs of a pair of pants can be rendered to remain substantially centered around the skeletal representation of the user's legs. The points at which the arms and legs bend also can quickly be determined from the skeletal information, which can be useful when attempting to determine how to render an image of an item for a current orientation of the user.

Figure 4A:
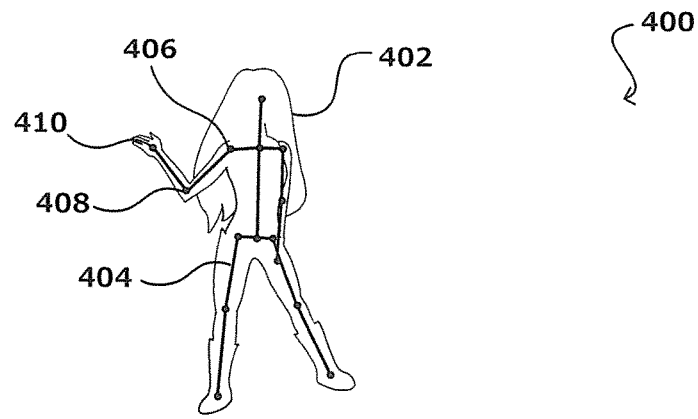
FIGS. 4A, 4B, and 4C illustrate example approaches to mapping image content to a user representation that can be utilized in accordance with various embodiments.

In order to provide more accurate views, a rendering engine can also utilize the shape 402 of the user as determined from the video feed, still images, three-dimensional virtual model or other such image information. For example, the skeletal information 404 can be used to quickly determine movements and positions, but the image information can provide a more accurate view of the shape of the user's body for the purpose of rendering the clothing to appear as if the user is actually wearing the clothing. As mentioned, this can include stretching, compressing, skewing, or otherwise modifying one or more portions of an item image in order to cause that item image to be shaped according to the specific user and user pose. In the example of FIG. 4A, the information would be used to render a top with one arm extended and pants with the legs spread somewhat apart, in order to match the orientation of the user's body. The information also can be used to adjust a rendering of the clothing items to substantially correspond to the outline of the user's body in order to make the image more realistic and appear as if the user is actually wearing those items.

In addition to determining the orientation and shape of the user, however, a system or service can also analyze data for a clothing item in order to be able to render a view of that item that corresponds to the determined orientation and shape. In the example situation 420 of FIG. 4B, for example, an image of a pair of pants 422 is illustrated that can be used with embodiments discussed herein. In order to facilitate analysis and/or rendering the pants can be displayed in an image with a transparent background or background that can relatively easily be removed from the image. In some embodiments, three-dimensional virtual model information might be available such that the pants can be rendered, texture-mapped, shaded, or otherwise processed to correspond to the determined shape and orientation. Various other processes can be used as well as known in the visual arts for mapping clothing items to the shape of a character.

Figure 4B:
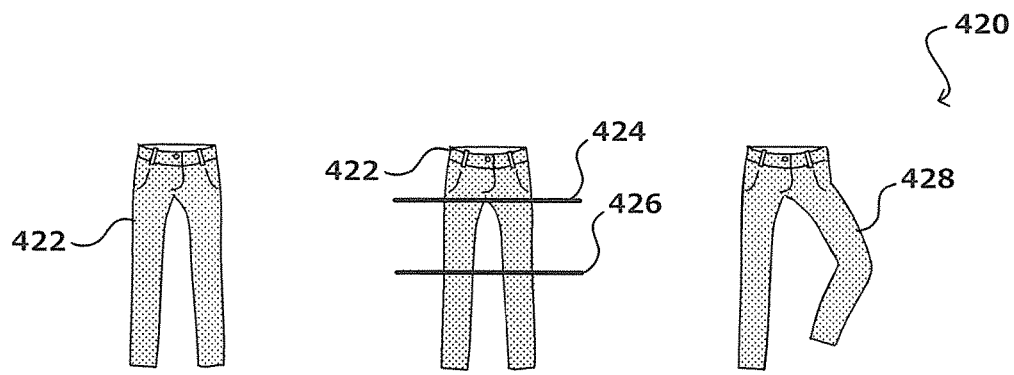

Using the pair of pants 422 as an example, an image modification process can determine a type of item corresponding to the image, such as whether the image shows a pair of pants, a shirt, a jacket, etc. Based at least in part on the type of item, an image manipulation model can be loaded that can be used to identify portions of the image to be manipulated. For example, a basic pants model might attempt to identify five major portions of a pants image. As illustrated in FIG. 4B, the pants portion can be separated from any background portion, then horizontal dividers can be used to separate a torso portion from the legs, and to divide the legs into upper and lower leg portions. In one example, a first horizontal position 424 is determined that substantially corresponds to the point at which the pant legs come together, or the point at which there is no longer any space between the pant legs. For basic pants (i.e., not capris or other such types) a second horizontal position 426 can be determined that is half way between the first horizontal position 424 and the bottom of the pant legs. This second horizontal position can be used to approximate the knee position in each pant leg. As can be seen in FIG. 4B, such an approach effectively divides the pants into a stationary torso portion and four leg portions, with an upper and lower leg portion for each leg. The portions of the pant image then can be mapped to the corresponding portion of the skeletal information, such as the skeletal information 404 illustrated in FIG. 4A. The portions of the pants image then can be rotated, repositioned, sheared, stretched, or otherwise manipulated to present an orientation 428 that substantially matches an orientation of the user. As discussed, the actual outline of the user's shape also can be used to stretch the portions of the item to match the user's body shape at any orientation. Methods for stretching, compressing, rotating, or otherwise distorting an image to fit a model, shape, or pattern are well known in the art and as such will not be discussed herein in detail.

Certain items may not be able to be properly placed and/or rendered using the skeletal and shape information alone, however. For example, sunglasses and hats may need to be positioned with specific orientations and positions that cannot readily be obtained from skeletal information, unless the information includes information such as eye position, chin position, and the like. Similarly, unless the outline of the user's shape includes the outline of specific features within the view of the user's body, additional analysis and/or processing may need to occur to provide for an appropriate rendering of such items.

Figure 4C:
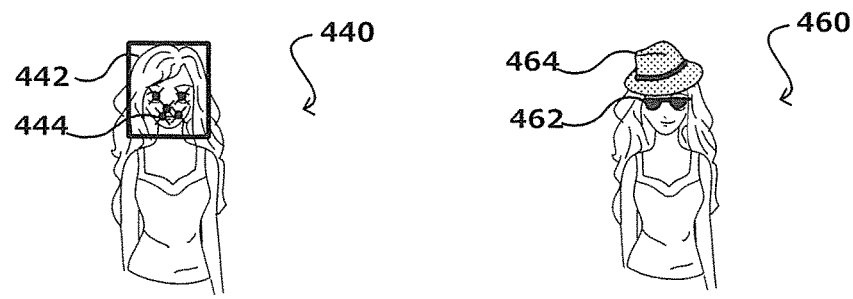

An approach that can be used in accordance with various embodiments is illustrated in the example state 440 of FIG. 4C. In this example, a head tracking and/or facial feature locating process (executing on the device, remote to the device, accessed through a specific API, etc.) is used to analyze the image and/or video information captured of the user or image data otherwise obtained. As known for such purposes, head and/or feature location can be provided by performing feature recognition, pattern matching, contour recognition, or another such process on the captured images of the user. In at least some embodiments, a head tracking algorithm can be used to locate an approximate region 442 of the user's head in the image information. The ability to locate an approximate head region can significantly reduce the amount of image information that must be analyzed for feature recognition. Further, in at least some embodiments the head tracking process can utilize head position information from the skeletal data of the gesture system to determine an approximate head position as well. A feature recognition or facial recognition process can be used to analyze image information within the facial region 442 to determine the approximate location of specific feature points 444 in the captured image information. These feature points can be any appropriate feature points, such as may include eye positions, nose positions, the positions at the edges of a user's mouth and eyebrows, and other such points. These points can be used to enable various types of items to be rendered on the user with an appropriate orientation.

For example, a view 460 of a user can be displayed that has image objects such as a pair of sunglasses 462 and a hat 464 rendered to appear as if the user is wearing the corresponding items. In at least some embodiments, multiple views of a hat, glasses, and other such items can be stored or rendered such that an orientation-dependent view can be provided that matches the orientation of the user's head. The eye positions or other such data can be used to position the items, and the location of the user's eyes or other features with respect to a center point of the user's head in the image can be used to determine a direction in which the user's head is pointing so as to properly render the items. As a user rotates his or her head, the feature positions will update as well such that the rendering of the items can be updated accordingly.

In at least some embodiments the image analysis and facial feature recognition can have an associated delay due at least in part to the necessary processing time. In at least some embodiments, the skeletal information can be used to update the head position in real time, and the facial feature recognition used to update orientation information as quickly as possible. Accordingly, there might be some lag in the updates in orientation due to the processing time if the user quickly turns his or her head, nods, or performs another such action, but the skeletal information can help to decrease the lag for at least large changes in user position. Is should be understood that similar processes can be used for fingers, toes, belly buttons, or other features where the user might want to put jewelry or other such items but those features may not readily be determined from the skeletal and/or shape data from the gesture system in certain embodiments.

As mentioned, user data can be shared with multiple computing devices across a network. The ability to share data can enable users to utilize user data with devices that are not directly connected to a primary user's computing device. For example, a user can stand in front of a gesture system embedded in a desktop computer or television while viewing data on a tablet computer or smart phone, where the user motions control selections on the tablet computer. A user can also perform gestures to select items to be pushed or otherwise transmitted to other devices. For example, a user selecting an item can cause information for that item to be sent to a wish list for that user that is stored on another device, or can cause information for that item to be sent to another user's device. For example, a user can see something that might be of interest to another user and use the interface to enable information for that item to be sent to a device of that user. Two or more users can also utilize the same gesture system concurrently in at least some systems, which can enable views of any or all of those users to utilize approaches discussed herein.

Figure 5A:
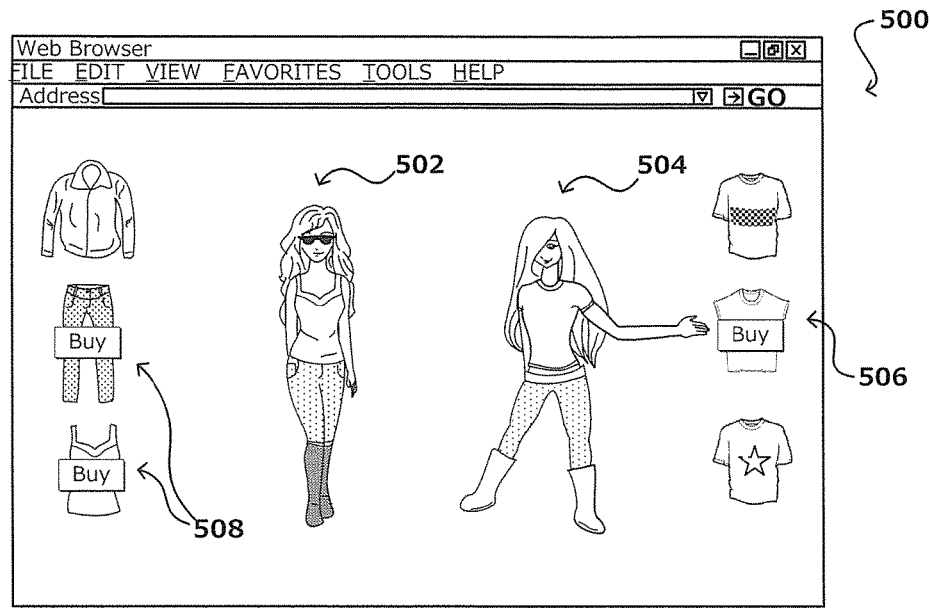
FIGS. 5A and 5B illustrate example interfaces with which multiple users can interact in accordance with various embodiments.

Similarly, the data from multiple gesture systems can be combined onto a single page or otherwise utilized on one or more computing devices. As an example, the interface state 500 illustrated in FIG. 5A illustrates views 502, 504 of two different users. The web page might enable both users to engage in a virtual shopping trip, where those users can be in the same location using the same gesture system or in different locations using different gesture systems. The JavaScript (or other active script) for the page can submit requests for data from the appropriate gesture system(s), and one or more widgets can be included in the page to allow that gesture data to be used to control various content displayed on the page. The same, similar, or different versions of the page can be viewed by each of the users, as well as other potential users having access to the gesture data. In this example, each user is able to perform actions or motions to cause items to be displayed on their respective views 502, 504. Two items 508 are shown to have been selected for a first user view 502, and a single item 506 for a second user view. In at least some embodiments, a user can select items to be rendered with respect to that user's view or another user's view. For example, a user might use one arm, hand, or finger to select an item and another arm, hand, or finger to point to the user view for which to render the item. Such an approach can enable users to have joint shopping sessions, where the users can try clothing or other items on their respective views as well as selecting items to have displayed on the other users.

Figure 5B:

In some embodiments, a user such as a parent might make selections for another user, such as a child. For example, a parent might be in a store or shopping online and see an item of interest. The parent might locate that item through the interface, such as by searching, scanning a barcode, capturing an image of that item, etc. The parent then might request the child, at home or in another location, to stand in front of a gesture system. The parent and/or child then can see what the item would look like on the child, and one or both of them can decide whether to purchase that item for the child, which can be done in the store or from an electronic marketplace, for example. In some embodiments, the child does not have to stand in front of the gesture system. Rather, previous image data used to generate a three-dimensional virtual model of the child can be used. In this situation, the item can appear to be worn by the three-dimensional representation of the child. The parent can then see what the item would look on the child, and can decide whether to purchase that item for the child. In some embodiments, the child might see a different view 520 of the items on the child's own device. For example, the child might have a computing device 522 as illustrated in FIG. 5B that is able to view information about the items of interest 526, 528, as well as a view of those items on the child 524. The child can provide feedback, select different items, or perform other actions with respect to the displayed content. Any changes on the child's device can also be replicated to the parent's view as well, such as to change the selection of items or view of the child in FIG. 5A.

A user also can cause information for items of interest to be pushed to another device for any of a number of different purposes. For example, a user might select a number of items when shopping on a home desktop computer with a gesture system. The user might make a gesture or motion that indicates the information should be stored to a portable computing device, or other designated location. As illustrated in the interface state 540 of FIG. 5B, information for the items can be stored to a wish list, virtual shopping list, or other such location that the user can take to various stores or physical locations to attempt to view the items in person, try on the items, etc. In some embodiments, an option might be provided to attempt to locate those items nearby, in addition to an option to purchase those items online. Various other approaches can be utilized as well within the scope of the various embodiments.

Figure 6:
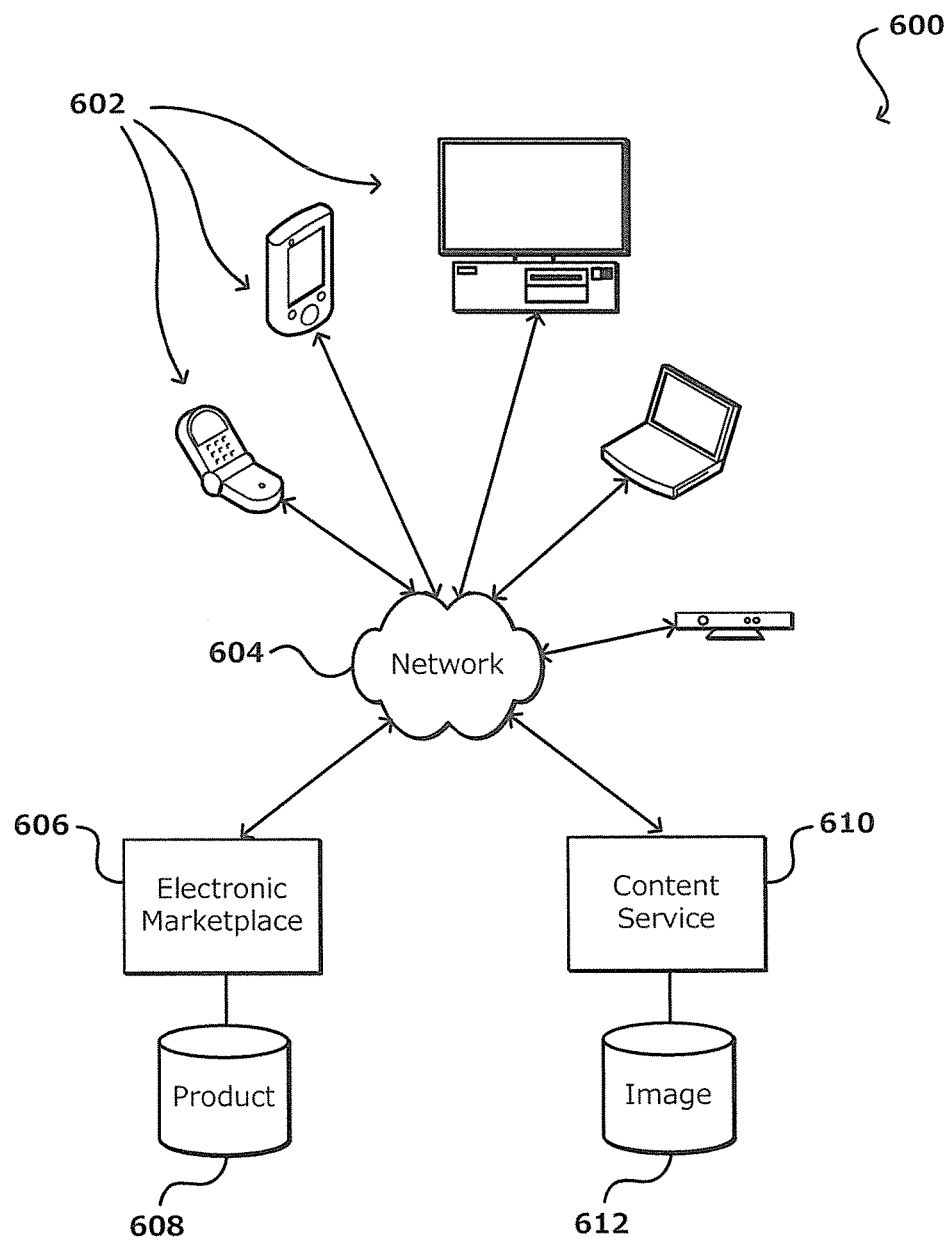
FIG. 6 illustrates an example environment in which various embodiments can be implemented.

FIG. 6 illustrates an example environment 600 in which aspects of various embodiments can be implemented. As discussed, the three-dimensional virtual model of a user as well as gesture data can be used with any of a number of different client devices 602 of any appropriate type. These devices can belong to the same or different users, and some, none, or all of these devices might include components capable of being utilized as a gesture system. Other devices might include, or require, outside or peripheral components to be utilized as a gesture system in various embodiments. In this example, the devices are connected across at least one network 604 to a content provider system, such as an electronic marketplace 606 offering products for consumption, where information for those products is stored in at least one product data store 608. The user can have an account with the electronic marketplace. The account can be used to manage aspects of the user's interactions with the electronic marketplace. For example, the user can manage their shopping preferences, search preferences, profile preferences, among other such account settings. The shopping preferences can be used to manage which items to display and/or emphasize, brands the user is most interested in, types of items the user is most interest in, etc. The search preferences can be used to manage the user's search experience. For example, the user can set various refinement parameters (e.g., price, shipping speed, clothing or shoe fit, style, etc.) that can be used to refine the user's search. The profile settings can be used to manage information associated the user. The information can include the user's age, height, weight, a three-dimensional virtual model of the user, etc.

A user can utilize one of the client devices 602 to view a page of content accessed from the electronic marketplace 606 over the at least one network. In embodiments where images of items such as clothing are to be manipulated and rendered with a view of the user, for example, the storing, modifying, and/or other processing of the images can be performed by a content service 610 or other such entity, where the content service can be associated with the electronic marketplace 606 or a third party provider. The images to be manipulated can be accessed from the product data store 608 of the electronic marketplace and/or an image data store 612 of the content service. In many embodiments the script enabling content to be manipulated by users via gesture systems can be executed on the client devices and/or the electronic marketplace system, while in other embodiments dedicated servers or other such components, services, or providers can manage the flow of gesture data and content between the various devices and locations.

Figure 7:
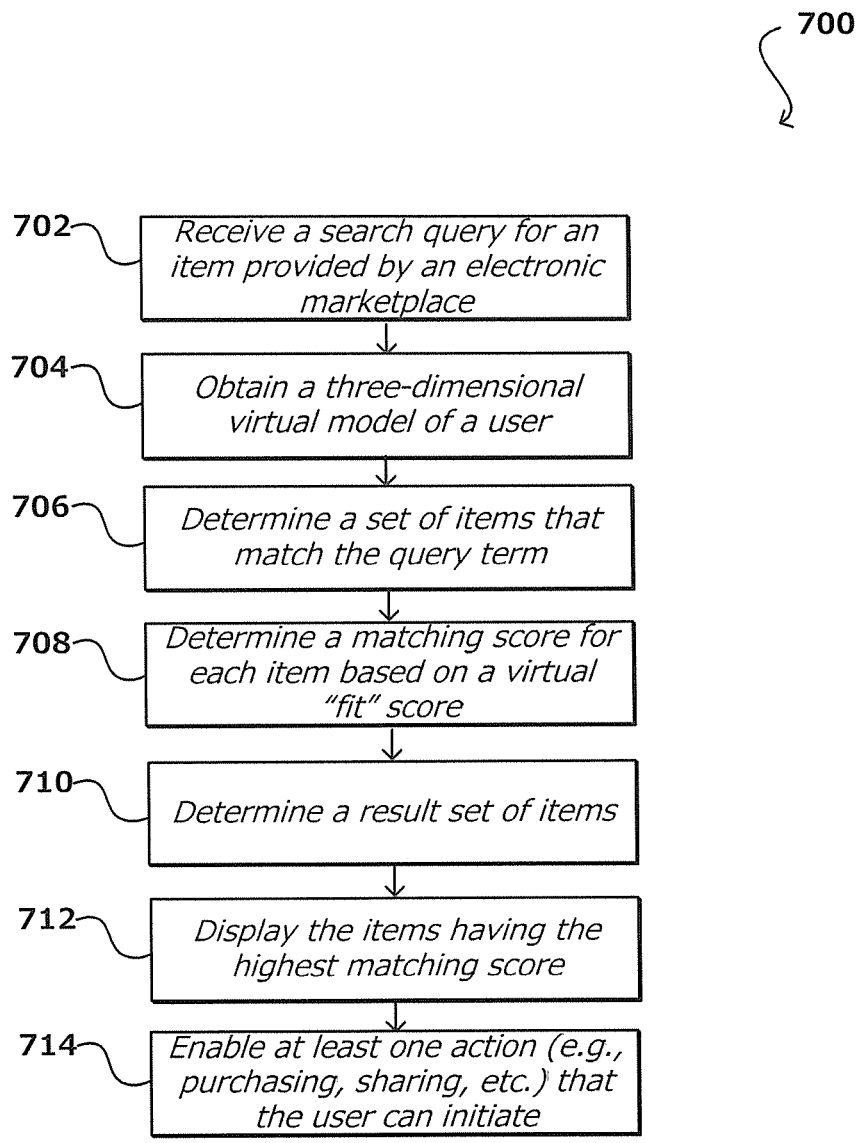
FIG. 7 illustrates an example process for determining content to present and the arrangement of that content in accordance with various embodiments.

FIG. 7 illustrates an example process 700 for determining content to present and the arrangement and/or order of that content in accordance with various embodiments. It should be understood that, for any process discussed herein, there can be additional, fewer, or alternative steps performed in similar or alternative orders, or in parallel, within the scope of the various embodiments unless otherwise stated. In this example, a search query is received 702 that includes a query term to search for an item(s) provided by an electronic marketplace or other website. The query term can be, for example, for items provided by the electronic marketplace such as a shoe, a t-shirt, or other item. Each item can be associated with information. The information might be image information, a description of the item, information that describes a three-dimensional virtual model of a visual representation of the item, etc. When the search is received, the electronic marketplace can obtain 704 information of a three-dimensional virtual model of the user. A set of items matching the query term can be determined 706. For each item, a matching score quantifying a visual appreciation can be determined 708 based on how well an item virtual "fits" the three-dimensional virtual model of the user. For example, various fitting algorithms or other similarity algorithms can be used to determine a virtual fit of the item on the three-dimensional virtual model of the user. The algorithms can use information associated with the three-dimensional virtual model of the user and other information (e.g., user preferences) for each of the items. Based on the matching score, a result set of items can be determined 710. For example, items having the highest matching score can be selected and displayed 712, in an ordered arrangement based on the matching score, with additional information associated with each item. In accordance with various embodiments, it can be desirable to rank items that the user will be more likely to view and/or purchase higher than other items, in order to improve the user experience and help the user more quickly locate items of interest. At least one action that the user can initiate can be enabled 714. Example actions include, for example, purchasing items, causing item information to be presented to other users or sent to other devices, and/or perform other such actions.

Figure 8:
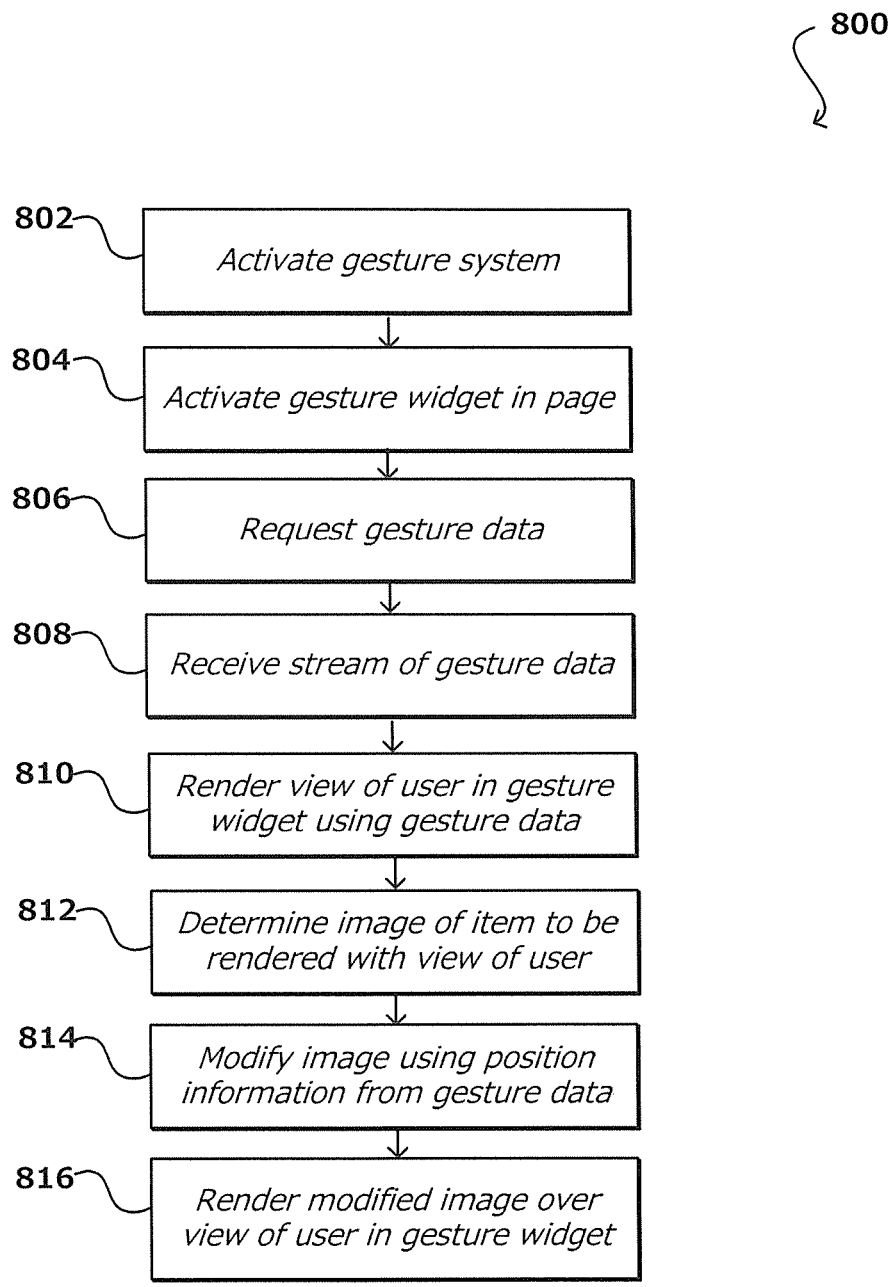
FIG. 8 illustrates an example process for enabling image content to be rendered with respect to a view of a user in accordance with various embodiments.

In various embodiments, the items can be shown to appear to be worn by the virtual representation of the user. Such a process enables a user to select or interact with any appropriate items displayed. In at least some embodiments, selected images or items can be modified and rendered to appear to be displayed on the virtual representation of the user. FIG. 8 illustrates an example process 800 for enabling items to be rendered on a view of a user of a gesture system in accordance with various embodiments. In this example, a gesture system is activated 802. The gesture system is configured to capture image, position, and/or motion data of a user. The system can be activated manually by a user, through a request or instruction from an application, or automatically in response to a user standing up or moving in front of the gesture system, among other such options. A gesture widget also can be loaded, executed, rendered, embedded or otherwise activated 804 in a page of content, or other interface portion, accessed by a user. In at least some embodiments the page is a Web page associated with JavaScript or another active script executing in a browser application and operable to utilize gesture data with the page of content. Gesture data can be requested 806 from the browser application and a stream of gesture data received 808 from the activated gesture system. As discussed, the gesture data can include various types of data, including image data captured of a user and position data determined using structured light detection or another such process. Other information can be requested as well, as may include information specifying a three-dimensional virtual model of the user. Using the received gesture data, a view of the user can be rendered 810 in the gesture widget that represents a current orientation of the user, with some delay due to the capture, transmission, processing, and rendering steps. Through script executing in the browser, at least one image to be rendered with the view of the user is determined 812. The image can correspond to a clothing item or other object selected by the user or otherwise indicated. Using position information from the gesture data indicating a current orientation or state of the user, the determined image can be modified 814 to correspond to the displayed orientation of the user. As discussed, the image can be stretched, compressed, skewed, or otherwise manipulated in order to correspond to the orientation and/or appearance of the user. The modified image then can be rendered 816 over the view of the user, in the proper location in the gesture widget, such that it appears as if the user is holding, wearing, or otherwise utilizing or interacting with the object in the image. Such an approach enables an image of an item from outside the gesture system environment to be modified and added to the environment in a way that makes it appear as if the item is actually with or on the user in the captured image information.

In accordance with various embodiments, while in some embodiments the view will correspond to video captured by the gesture system, in other embodiments the view can provide an avatar, directional indicator, or other such graphical element that enables the user to determine at least some aspect of the input being provided by the gesture system. Using the gesture data, the direction and/or extent of a gesture being performed by the user can be determined. As discussed, this can involve determining the angle of a user's arm or finger, as well as how far the arm or finger is extended, among other such information. Using the direction and/or extent information, the user can be enabled to interact with content on the page that is outside the gesture widget. As mentioned, this can involve selecting items to purchase, search results to view, options to activate, or other such functionality. In at least some embodiments, the script of the page is also enabled to interact with one or more aspects of the gesture widget, such as to change an appearance of the user view, add an additional view, select one of multiple users having gesture information collected, and the like. Various other options can be utilized as well within the scope of the various embodiments.

Since gesture data can include image information including a view of the user, a system can attempt to determine aspects of the user that can assist with various aspects of, for example, a user selection process. If a facial recognition process can identify the user, search results can be displayed that are based upon preferences or stored information for that user. If an image analysis process can identify a gender or approximate age or size of a user, that information can be used to narrow search results or other information selected to be displayed to the user. If views of a male user and a female user are shown on a page, and an item for a female is selected, the system can assume that the item should be rendered for the female in at least some situations. Various other aspects can be determined and used to adjust a selection of content as well within the scope of the various embodiments.

In some embodiments, a computing device might utilize one or more motion-determining elements, such as an electronic gyroscope, to attempt to assist with motion and gesture determinations. By determining movements of the device during image capture, effects of the device movement can be removed to provide more accurate three-dimensional position information for the tracked user features. Further, determining that an apparent motion in the image information was due to a device movement instead of a user gesture can help to prevent false input determinations.

Figure 9:
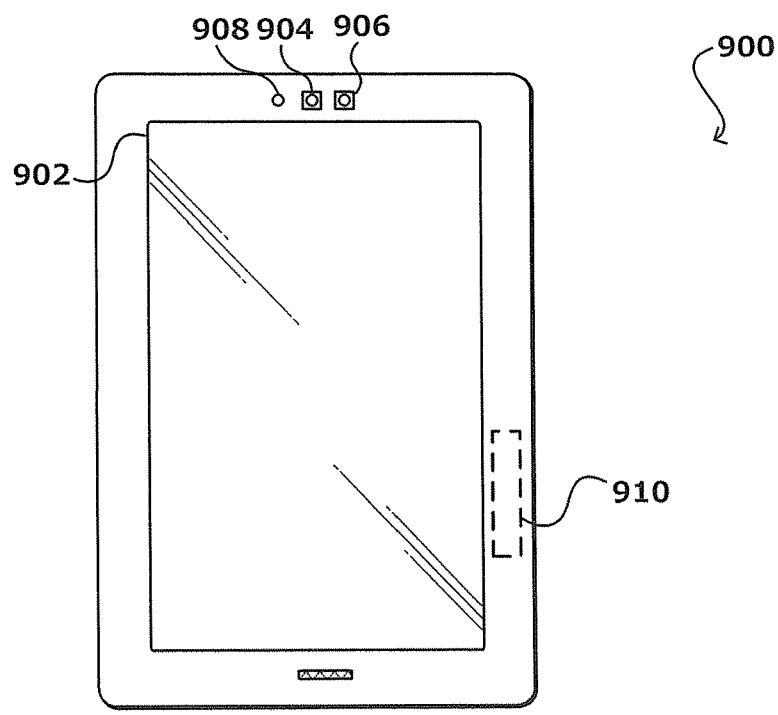
FIG. 9 illustrates an example computing device that can be used in accordance with various embodiments.

FIG. 9 illustrates an example computing device 900 that can be used to perform methods in accordance with various embodiments discussed and suggested herein. In this example, the device has at least one camera or sensor 904, 906 positioned at various locations on the same side of the device as a display element 902, enabling the device to capture image and/or position information about a user of the device during typical operation where the user is at least partially in front of the display element. In this example, the camera and/or sensor are each capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 908 is included that can be used to determine an amount of light in a general direction of objects to be captured. In some embodiments, at least one illumination element, such as a white light emitting diode (LED) or infrared (IR) emitter, as discussed elsewhere herein, can be utilized for providing illumination in a particular range of directions when, for example, there is insufficient ambient light determined by the light sensor or reflected IR radiation is to be captured, such as where a pattern of structured light is to be produced as part of a gesture system. A motion determining element 910 can also be utilized to attempt to distinguish user movement from device movement. Various other elements and combinations of elements can be used as well within the scope of the various embodiments as should be apparent in light of the teachings and suggestions contained herein.

Figure 10:
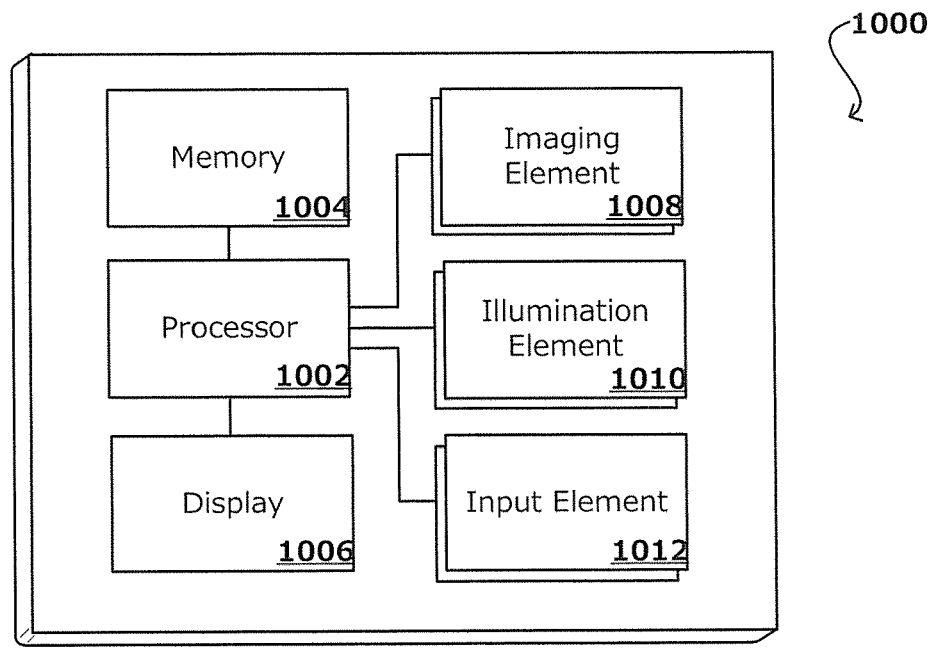
FIG. 10 illustrates an example configuration of components of a computing device such as that illustrated in FIG. 9.

In order to provide various functionality described herein, FIG. 10 illustrates an example set of basic components of a computing device 1000, such as the device 900 described with respect to FIG. 9. In this example, the device includes at least one central processor 1002 for executing instructions that can be stored in at least one memory device or element 1004. As would be apparent to one of ordinary skill in the art, the device can include many types of memory, data storage or non-transitory computer-readable storage media, such as a first data storage for program instructions for execution by the processor 1002, the same or separate storage can be used for images or data, a removable storage memory can be available for sharing information with other devices, etc. The device typically will include some type of display element 1006, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 1008, such as one or more cameras or sensors that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. In some embodiments, the cameras and/or sensors used for motion and gesture recognition might be provided through a separate peripheral device, such as a sensor bar. The example device includes at least one illumination component 1010, such as an IR source with a patterned lens for producing structured light. The device also can include at least one other illumination element, as may include one or more light sources (e.g., white light LEDs, IR emitters, or flashlamps) for providing illumination for a standard digital video camera.

The example device can include at least one additional input element 1012 configured to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

As discussed, different approaches can be implemented in various environments in accordance with the described embodiments. As will be appreciated, although a Web-based environment is used in various examples for purposes of explanation, different environments may be used, as appropriate, to implement various embodiments. An example electronic client device can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. The network can include the Internet, a cellular network, a local area network (LAN) and the like. Various network-specific components can be used, although not shown, as would be apparent to one of ordinary skill in the art.

It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. An application server can include any appropriate hardware and software for integrating with the data store as needed to execute aspects of one or more applications for the client device and handling a majority of the data access and business logic for an application. The application server can provide access control services in cooperation with the data store and is able to generate content such as text, graphics, audio and/or video to be transferred to the user, which may be served to the user by a Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store can include mechanisms for storing content (e.g., production data) and user information, which can be used to serve content for the production side. The data store can also include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depiction of the system should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, JavaScript, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and non-transitory computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
a computing device processor; and
a memory device including instructions that, when executed by the computing device processor, cause the computing system to:
receive a search request specifying query content, the search request initiated by a user device;
determine a three-dimensional virtual model of a user;

determine a set of objects specified by the search request, objects of the set of objects corresponding to respective virtual representations;

determine an arrangement of the set of objects based at least in part on a set of matching scores between the three-dimensional virtual model of the user and the virtual representations corresponding to the respective objects of the set of objects, wherein the matching scores are based, at least in part, on a fit of the virtual representation corresponding to the respective object on the three-dimensional virtual model, the fit measured using a curve fitting algorithm; and provide information to the user device for displaying at least a subset of objects for presentation according to the arrangement.

2. The computing system of claim 1, wherein the search request or a subsequent request includes an additional search refinement parameter, and wherein the matching score is further based at least in part on the search refinement parameter, and wherein the search refinement parameter includes information about one of clothing fit preferences, hair color, skin color, or clothing material preferences.

3. The computing system of claim 1, wherein the instructions, when executed further cause the computing system to:

retrieve purchase history information associated with the user, the purchase history information including purchases of apparel;

determine sizing information associated with the apparel; and update the three-dimensional virtual model using the sizing information and purchase history.

4. The computing system of claim 1, further comprising a display and a communication module, and wherein the instructions, when executed to provide information further cause the computing system to:

retrieve a product preview from an electronic marketplace using the communication module;

display the product preview including a product available for purchase from the electronic marketplace on the display of the computing system, the product being displayed based at least in part on the search request, the search request including at least one search term.

5. The computing system of claim 4, wherein the instructions, when executed further cause the computing system to:

generate a view of a virtual representation of the product appearing to be worn by the three-dimensional virtual model, wherein generating the view of the product includes one of:

identifying at least one of an arm or a leg portion of the virtual representation of the product and adjusting at least one of a position or orientation of at least a portion of the identified arm or leg portion to correspond to a portion of the three-dimensional virtual model, rotating, shearing, skewing, stretching, compressing or translating at least a portion of the view, or identifying a shape of a portion of the three-dimensional virtual model represented in the view and manipulating an appearance of the product to correspond to the identified shape.

6. The computing system of claim 4, wherein the instructions, when executed further cause the computing system to:

display a view of a virtual representation of the product appearing to be worn to be updated in response to input from the user, the input including a selection of a navigation element associated with the three-dimensional virtual model of the user, the navigation element configured to control one of a zoom of the three-dimensional virtual model of the user or an orientation of the three-dimensional virtual model of the user.

7. The computing system of claim 1, wherein the instructions, when executed to determine the arrangement, further cause the computing system to:

determine at least one input for a ranking algorithm, the ranking algorithm configured to accept the at least one input; and determine the arrangement of the set of objects, the plurality of inputs including at least one of the matching score, user preferences, or refinement parameter.

8. The computing system of claim 7, wherein the instructions, when executed to provide information further cause the computing system to:

determine a change in an orientation of at least a portion of the computing system; and update, based at least in part on the change in orientation, one of a zoom of the three-dimensional virtual model of the user or an orientation of the three-dimensional virtual model of the user.

9. The computing system of claim 7 further comprising a display, wherein the instructions, when executed further cause the computing system to:

provide for display, to at least a second user, the view of a virtual representation of the product appearing to be worn by the three-dimensional virtual model of the user; and enable the second user to perform at least one task selected from providing feedback with respect to the product, suggesting an alternative product, or suggesting an additional product.

10. The computing system of claim 1, wherein the instructions, when executed further cause the computing system to:

obtain sensor data, the sensor data including one of image data of a representation of the user, audio data of the user, depth data, or infrared data; and analyze the sensor data to determine the three-dimensional virtual model of the user, the three-dimensional virtual model approximating the shape of the user.

11. The computing system of claim 1, wherein the set of objects are images of clothing items that are available for the user to purchase at an electronic marketplace, and wherein the instructions, when executed further cause the computing system to:

receive a request from the user for assistance in selecting clothing items;

determine a set of users to potentially provide the assistance; and notify the set of users of the request.

12. The computing device of claim 11, wherein the instructions, when executed further cause the computing system to:

compensate at least one user from the set of users in response to the user obtaining a clothing item suggested by the at least one user from the set of users.

13. A method, comprising:

receiving a search request from a user device specifying query content;

determining a three-dimensional virtual model of a user;

determining a set of objects specified by the search request, objects of the set of objects corresponding to respective virtual representations;

determining an arrangement of the set of objects based at least in part on a set of matching scores between the three-dimensional virtual model of the user and the virtual representations corresponding to the respective objects of the set of objects, wherein the matching scores are based, at least in part, on a fit of the virtual representation corresponding to the respective object on the three-dimensional virtual model, the fit measured using a curve fitting algorithm; and providing information to the user device for displaying at least a subset of objects for presentation according to the arrangement.

14. The method of claim 13, wherein the search request or a subsequent request includes an additional search refinement parameter, and wherein the matching score is further based at least in part on the search refinement parameter, and wherein the search refinement parameter includes information about one of clothing fit preferences, hair color, skin color, or clothing material preferences.

15. The method of claim 13, further comprising:

retrieving purchase history information associated with the user, the purchase history information including purchases of apparel;

determining sizing information associated with the apparel; and updating the three-dimensional virtual model using the sizing information.

16. The method of claim 13, further comprising:

displaying a product preview including at least one product available for purchase from an electronic marketplace, the at least one product being displayed based at least in part on the search request, the search request including at least one search term, wherein the product preview includes a view of a virtual representation of the at least one product appearing to be worn by the three dimensional virtual model of the user.

17. The method of claim 5, wherein the instructions, when executed further cause the computing system to:

receive a selection of the product, wherein the view of the product appearing to be worn by the three-dimensional model is generated after receiving the selection.

* * * * *